United States Patent
Wada

(10) Patent No.: US 9,494,193 B2
(45) Date of Patent: Nov. 15, 2016

(54) SLIDING MEMBER AND SLIDING BEARING

(71) Applicant: Taiho Kogyo Co., Ltd., Aichi (JP)

(72) Inventor: Hitoshi Wada, Aichi (JP)

(73) Assignee: Taiho Kogyo Co., Ltd., Aichi (JP)

( * ) Notice: Subject to any disclaimer, the term of this patent is extended or adjusted under 35 U.S.C. 154(b) by 0 days.

(21) Appl. No.: 14/773,456

(22) PCT Filed: Mar. 25, 2014

(86) PCT No.: PCT/JP2014/058267
§ 371 (c)(1),
(2) Date: Sep. 8, 2015

(87) PCT Pub. No.: WO2014/157193
PCT Pub. Date: Oct. 2, 2014

(65) Prior Publication Data
US 2016/0025132 A1    Jan. 28, 2016

(30) Foreign Application Priority Data

Mar. 29, 2013   (JP) .................. 2013-072012

(51) Int. Cl.
| | | |
|---|---|---|
| *B22F 7/02* | (2006.01) | |
| *F16C 33/12* | (2006.01) | |
| *C25D 7/10* | (2006.01) | |
| *C25D 11/34* | (2006.01) | |

(Continued)

(52) U.S. Cl.
CPC ............ *F16C 33/122* (2013.01); *B22F 7/02* (2013.01); *B32B 15/01* (2013.01); *B32B 15/013* (2013.01); *B32B 15/015* (2013.01); *C22C 9/00* (2013.01); *C22C 9/02* (2013.01); *C22C 12/00* (2013.01); *C22C 38/00* (2013.01); *C22C 38/04* (2013.01); *C25D 7/10* (2013.01); *C25D 11/02* (2013.01); *C25D 11/34* (2013.01); *F16C 33/121* (2013.01); *F16C 33/124* (2013.01)

(58) Field of Classification Search
None
See application file for complete search history.

(56) References Cited

U.S. PATENT DOCUMENTS

| | | | | |
|---|---|---|---|---|
| 4,582,368 A | * | 4/1986 | Fujita ............... | F16C 33/201 |
| | | | | 384/13 |
| 6,652,675 B2 | * | 11/2003 | Sakai ............... | C22C 1/0425 |
| | | | | 148/432 |

(Continued)

FOREIGN PATENT DOCUMENTS

| | | |
|---|---|---|
| JP | H05-1717 A | 1/1993 |
| JP | 2006-266445 A | 10/2006 |

(Continued)

OTHER PUBLICATIONS

Haynes et al., Handbook of Chemistry and Physics, 2016, CRC Press, 96$^{th}$ edition, pp. 4-138-4-144.*

(Continued)

*Primary Examiner* — Humera Sheikh
*Assistant Examiner* — Seth Dumbris
(74) *Attorney, Agent, or Firm* — Osha Liang LLP

(57) ABSTRACT

A sliding member includes a base layer including soft particles made of a soft material softer than a matrix and deposited in the matrix, and a soft layer made of the soft material formed on a surface of the base layer. A boundary portion is formed between crystal grains that have a unique crystal grain structure of the soft particles and crystal grains that have a unique crystal grain structure of the soft layer. An anodic oxidation film of the soft material is formed on the boundary portion.

4 Claims, 3 Drawing Sheets

(51) Int. Cl.
*C22C 9/02* (2006.01)
*C22C 12/00* (2006.01)
*C22C 38/00* (2006.01)
*C22C 38/04* (2006.01)
*C25D 11/02* (2006.01)
*B32B 15/01* (2006.01)
*C22C 9/00* (2006.01)

(56) References Cited

U.S. PATENT DOCUMENTS

| | | | | |
|---|---|---|---|---|
| 6,864,307 B2* | 3/2005 | Niwa | ............ | C08L 27/18 |
| | | | | 524/439 |
| 2010/0276432 A1* | 11/2010 | Huo | ............ | A47J 36/025 |
| | | | | 220/573.2 |
| 2012/0180747 A1* | 7/2012 | Domanchuk | ............ | C23C 4/10 |
| | | | | 123/193.6 |
| 2016/0025131 A1* | 1/2016 | Wada | ............ | C30B 7/12 |
| | | | | 428/558 |

FOREIGN PATENT DOCUMENTS

| | | |
|---|---|---|
| JP | 2008-057769 A | 3/2008 |
| JP | 2009-203504 A | 9/2009 |
| JP | 2011-163382 A | 8/2011 |
| WO | 2010/030031 A1 | 3/2010 |

OTHER PUBLICATIONS

Ted Pella, Inc., "Hardness Tables", https://www.tedpella.com/company_html/hardness.htm, accessed Mar. 8, 2016.*
International Search Report issued in PCT/JP2014/058267 mailed on Jul. 8, 2014 (3 pages).
Written Opinion of the International Searching Authority issued in PCT/JP2014/058267 mailed on Jul. 8, 2014 (8 pages).

* cited by examiner

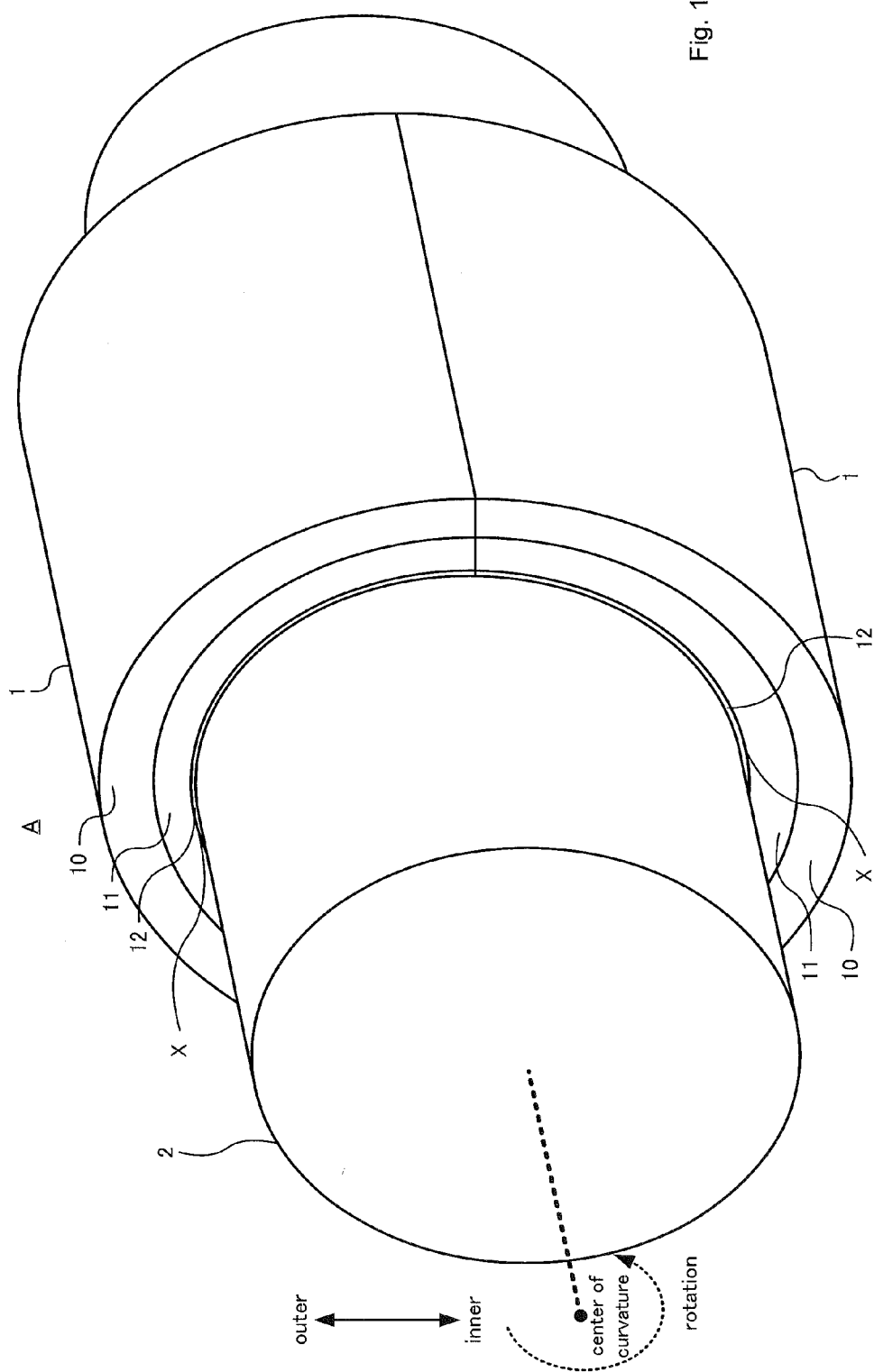

SLIDING MEMBER AND SLIDING BEARING

TECHNICAL FIELD

The present invention relates to a sliding member and a sliding bearing whereon a mating member is sliding.

BACKGROUND ART

A technology comprising forming voids by ultrasonic cleaning a surface of Cu alloy and plating Bi overlay layer on the surface of Cu alloy and the voids, is known (Patent documents JP2009-203504A). Accordingly, the overlay layer can be formed so that the Bi filled in the voids become anchors.

CITATION LIST

Patent Literature

[PTL1]
JP2009-203504A

SUMMARY OF THE INVENTION

Technical Problem

However, array direction of the crystal grains of Bi filled in voids and Bi of the overlay layer are uniform, because Bi filled in voids and Bi of the overlay layer are continuously grown. That is, there is a problem that grain boundaries of Bi filled in voids and grain boundaries of Bi of the overlay layer continuously connect in a vertical direction for a sliding plane, and fatigue fractures transmit to Cu alloy from the overlay layer along the continuous grain boundaries.

The present invention is made in consideration of such a problem, and provides a technology to refrain fatigue fractures from transmitting to a base layer from a soft layer.

Solution to Problem

The present invention discloses a sliding member, comprised of a base layer including soft particles made of a soft material softer than a matrix and deposited in the matrix, and a soft layer made of the soft material formed on a surface of the base layer. And a boundary portion is formed between crystal grains that have a unique crystal grain structure of the soft particles and crystal grains that have a unique crystal grain structure of the soft layer.

The soft particles deposited in the base layer and existing on a boundary surface between the base layer and the soft layer adhere to the soft layer. That is, the soft material composing the soft particles existing on the boundary surface between the base layer and the soft layer and the soft material composing the soft layer, adhere each other. In this manner, common soft material adheres between the soft particles existing on the boundary surface of the base layer, and the soft layer. In the present invention, the boundary portion between the crystal grains with the unique crystal grain structure (e.g. size and array direction of crystal grains) of the soft particles and the crystal grains with the unique crystal grain structure of the soft layer, is formed, on a boundary surface where the common soft material adheres. Therefore, it is possible to refrain the intergranular fracture arisen in the soft layer from penetrating the boundary surface between the base layer and the soft layer, because the grain boundary of the soft layer and the grain boundary of the soft particles in the base layer can be discontinuous. That is, it is possible to refrain the fatigue fracture arisen in the soft layer from transmitting to the base layer via the soft particles. Further, it is possible to refrain the alloy components other than the soft material included in the soft layer from diffusing to the base layer via the soft particles.

Further, the anodic oxidation film of the soft material can be formed on the boundary portion between the crystal grains that have the unique crystal grain structure of the soft particles and the crystal grains that have the unique crystal grain structure of the soft layer. That is, it is possible to prevent the soft materials of the soft layer from being epitaxially grown from the soft particles exposed on the surface of the base layer, by anodic oxidizing the soft particles exposed on the surface of the base layer before laminating the soft layer on the surface of the base layer. That is, it is possible to grow the crystal of the soft material with the crystal grain structure different to that of the soft particles, even on the soft particles exposed on the surface of the base layer.

Further, the matrix of the base layer can be Cu alloy and the soft material can be Bi. The conformability can be realized by the soft layer made of Bi, because Bi is softer than Cu alloy. Cu alloy means the alloy including Cu as a main component. The soft particles of Bi can deposit in Cu alloy because Bi does almost not have solid solubility for Cu. However, the matrix of the base layer does not limit to Cu alloy and the material of the matrix can be selected according to circumstances e.g. the hardness of the mating member. Further, materials e.g. Pb as long as softer than the matrix and are able to deposit in the matrix, can be the soft material.

BRIEF DESCRIPTION OF THE DRAWINGS

FIG. 1 is a perspective view of a sliding member.

DESCRIPTION OF EMBODIMENT

Figure 2A:
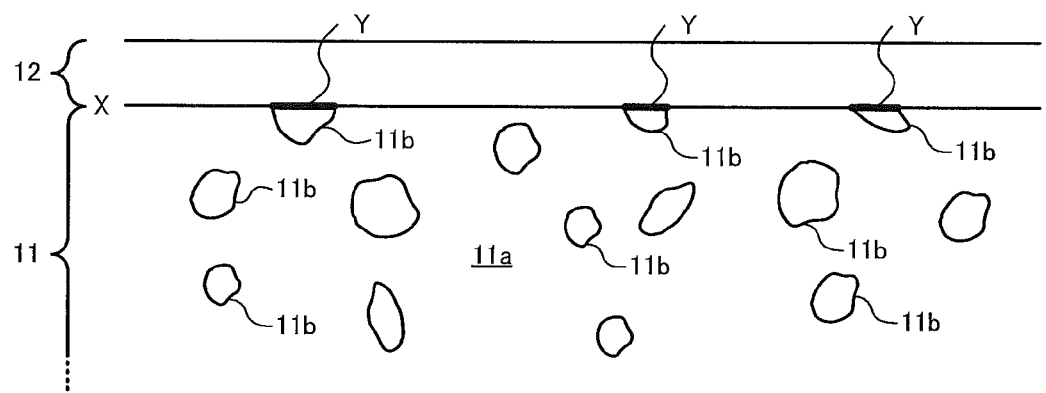
FIGS. 2A and 2B are schematic cross sectional views of sliding member.

Preferred embodiments of the present invention will be described in the following order.
(1) First Embodiment
  (1-1) Configuration of a Sliding Member:
  (1-2) Measuring Method:
  (1-3) Manufacturing Method of a Sliding Member:
(2) Other Embodiment
(1) First Embodiment
  (1-1) Configuration of a Sliding Member:
FIG. 1 is a perspective view of a sliding member 1 as an embodiment of the present invention. The sliding member 1 is comprised of a back metal 10, a lining 11 and an overlay 12. The sliding member 1 is a metal member in a half pipe shape that is a bisection shape of a hollow cylinder sectioned at a diametral plane. A cross-sectional shape of the sliding member 1 is a half circular arc. A sliding bearing A can be manufactured by combining two sliding members 1 to be in a cylindrical shape. A mating shaft 2 (e.g. a crankshaft of an engine) is inserted in an inner hollow space of the sliding bearing A. An outer diameter of the mating shaft 2 is a little smaller than an inner diameter of the sliding bearing A. A lubricating oil (e.g. engine oil) is provided to a clearance formed between an outer surface of the mating shaft 2 and an inner surface of the sliding bearing A. Then the outer surface of the mating shaft 2 can slide on the inner surface of the sliding bearing A.

The sliding member 1 has a layered structure wherein the back metal 10, the lining 11 and the overlay 12 are laminated in order from a far side of the center of curvature. Therefore, the back metal 10 forms an outermost layer of the sliding member 1 and the overlay 12 is an innermost layer of the sliding member 1. Each of the back metal 10, the lining 11 and the overlay 12 has a constant thickness in a circumferential direction. The thickness of the back metal 10 is 1.3 mm. The thickness of the lining 11 is 0.2 mm. And the thickness of the overlay 12 is 10 μm. A radius of a surface of the overlay 12 facing the center of curvature (an inner radius of the sliding member 1) is 40 mm. In this specification, "the inner side" means a side nearby the center of curvature of the sliding member 1 and "the outer side" means an opposite side to the center of curvature of the sliding member 1. The inner surface of the overlay 12 corresponds to a sliding surface between the sliding member 1 and the mating shaft 2.

The back metal 10 is made of steel consisted of 0.15 wt % (weight percentage for the back metal 10) of C (copper), 0.06 wt % of Mn (manganese) and the balance Fe (ferrum). In addition, the back metal 10 can be made of a material that can support a load transmitted from the mating shaft 2 through the lining 11 and the overlay 12. Therefore the back metal 10 can be made of a material other than the steel.

The lining 11 is a layer laminated on an inner surface of the back metal 10. The lining 11 corresponds to a base layer of the present invention. The lining 11 is consisted of 10 wt % (weight percentage for the lining 11) of Sn (tin), 8 wt % of Bi (bismuth) and the balance. The balance is consisted of Cu and unavoidable impurities. The unavoidable impurities included in the lining 11 are elements e.g. Mg (magnesium), Ti (titanium), B (boron), Pb (lead) and Cr (chromium). The unavoidable impurities are contaminated when the materials of the lining 11 are refined and/or scraped. Total weight percentage of the unavoidable impurities it less than 1.0 wt %.

FIG. 2A is a schematic cross sectional views of the sliding member 1. In FIG. 2A, the curve of the sliding member 1 is ignored. In the lining 11, Bi particles 11b are deposited in a matrix 11a made of Cu—Sn alloy. Bi particles 11b are softer than the matrix 11a and corresponds to the soft particles of the present invention. Strength and wear resistance can be improved by adopting hard Cu—Sn alloy as the matrix 11a of the lining 11.

The average equivalent circle diameter of Bi particles 11b on the cross sectional plane of the lining 11 was 100 μm. That is, the average area of Bi particles 11b on the cross sectional plane of the lining 11 was 2500π μm². The area ratio of Bi particles 11b on the cross sectional plane of the lining 11 was 10%. The average equivalent circle diameter, the average area and the area ratio of Bi particles 11b on a boundary surface X between the lining 11 and the overlay 12 can be considered as same as the average equivalent circle diameter, the average area and the area ratio of Bi particles 11b on arbitrary cross sectional planes, because the distribution of Bi particles 11b in the lining 11 has uniformity and no directional dependency.

The overlay 12 is a layer laminated on an inner surface of the lining 11. The overlay 12 corresponds to the soft layer of the present invention. The inner surface of the lining 11 corresponds to the boundary surface X between the lining 11 and the overlay 12. The overlay is consisted of Bi and unavoidable impurities. The unavoidable impurities included in the overlay 12 are elements e.g. Sn, Fe and Pb. The unavoidable impurities are impurities contaminated from plating liquid for the overlay 12. In the lining 11, total weight percentage of the unavoidable impurities is not more than 1.0 wt % and the weight percentage of Bi is not less than 99%.

The crystal grain structure of Bi in the overlay 12 is determined according to the crystal growth condition of lamination of the overlay 12 on the surface of the lining 11. Consequently, the crystal grain structure of Bi composing Bi particles 11b existing on the boundary surface X between the lining 11 and the overlay 12 and the crystal grain structure of Bi composing the over lay 12 are determined according to different crystal growth condition each other. Therefore, the over lay 12 and Bi particles 11b existing on the boundary surface X between the lining 11 and the overlay 12 are made of same material (Bi), but the boundary portion Y where the crystal grain structure is changing is formed between them. That is, the boundary portion Y between Bi crystal grains that have the unique crystal grain structure of the soft particles 11b deposited in the lining 11 and Bi crystal grains that have the unique crystal grain structure of the overlay 12, is formed.

Figure 2B:
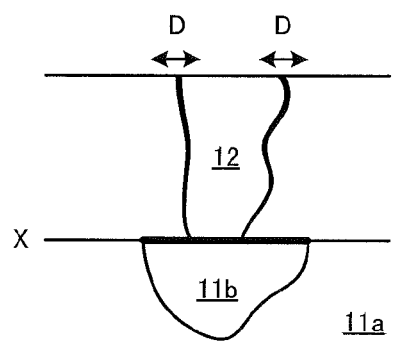

FIG. 2B is a schematic view showing the state that the fatigue fracture D is arisen in the overlay 12. As shown in the FIG. 2B, even if fatigue fracture D arisen in the overlay 12, it is possible to refrain the fatigue fracture D from penetrating the boundary portion Y between Bi particles 11b and the overlay 12 because the crystal grain structures of Bi particles 11b and that of the overlay 12 are different from each other and the grain boundary is discontinuous on the boundary portion Y between Bi particles 11b and the overlay 12. Therefore, it is possible to refrain the fatigue fracture D from penetrating the boundary surface X between the lining 11 and the overlay 12. That is, it is possible to refrain the fatigue fracture D arisen in the overlay 12 from transmitting to the lining 11 via Bi particles 11b. Further, it is possible to refrain the alloy components other than Bi included in the overlay 12 from diffusing to the lining 11 via Bi particles 11b.

(1-2) Measuring Method:

The measurement values mentioned in the embodiment were measured by methods explained hereinafter.

The masses of atoms included in the layers of the sliding member 1 were measured by an ICP (Inductively Coupled Plasma) atomic emission spectrometry analyzer (ICPS-8100 made by SHIMADZU CORPORATION).

The average equivalent circle diameter of Bi particles 11b included in the lining 11 was measured by the methods as follows. First, the arbitrary cross sectional planes of the lining 11 (not limited in directions vertical to the rotation axis of the mating shaft 2) were polished by alumina abrasive grains whose diameter were 2 μm. Observation image (backscattered electron images) was prepared by imaging an observation view field covering an area of 0.02 mm² on the arbitrary cross sectional plane of the lining 11 by an electron microscope (JSM-6010A made by JEOL Ltd.) with 500 times of the optical magnification. Next, the observation image was input to an image analyzing system (LUZEX II made by NIRECO CORPORATION) and images of Bi particles 11b were detected from the observation image. There were edges (boundary where brightness, chroma or hue was changed more than a predetermined threshold) along outlines of the images of Bi particles 11b. So, areas closed by the edges are detected from the observation image, as the images of Bi particles 11b, by the image analyzing system.

Next, the images of Bi particles 11b were extracted from the observation image and the projected area-equivalent diameters (measurement parameter: HEYWOOD) of the images of all Bi particles 11b was measured by the image analyzing system. The projected area-equivalent diameter was a diameter of a circle having an area identical to the area of the image of Bi particles 11b and a real-space length converted from the diameter of image of Bi particles 11b based on the optical magnification. Further, an arithmetic mean (sum total/number of Bi particles 11b) of projected area-equivalent diameters of all Bi particles 11b was measured as the average equivalent circle diameter of Bi particles 11b. Further, the total area of all Bi particles 11b was measured by multiplying the area of a circle with a diameter identical to the average equivalent circle diameter of Bi particles 11b and the number of all Bi particles 11b existing in the observation view field. Finally, the area ratio of Bi particles 11b was measured by dividing the total area of all Bi particles 11b by an area of the observation view field. In addition, the projected area-equivalent diameters less than 1.0 μm were ignored for calculation of the average equivalent circle diameter of Bi particles 11b .e.g., because the projected area-equivalent diameters less than 1.0 μm might decrease a reliability of the projected area-equivalent diameter and a reliability of detection of the components.

Figure 3A:
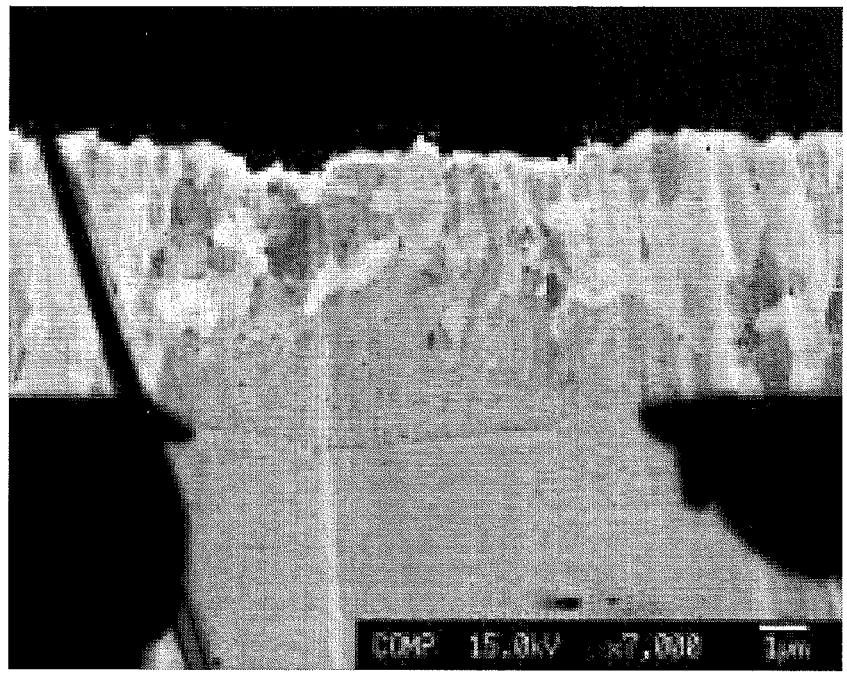
FIGS. 3A and 3B are photographs of cross sectional views of sliding member.
Figure 3B:
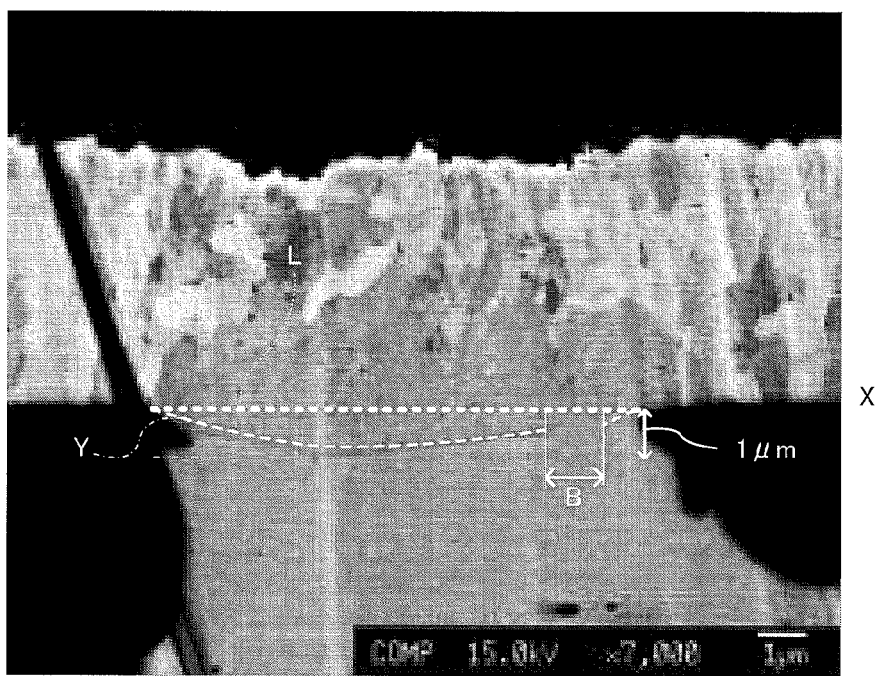

The boundary portion Y between Bi crystal grains that have the unique crystal grain structure of the soft particles 11b deposited in the lining 11 and Bi crystal grains that have the unique crystal grain structure of the overlay 12, is detected by the methods as follows. First, a cross sectional plan of the sliding member 1, sectioning in radial direction, was polished by a cross section polisher. Observation image was prepared by imaging an arbitrary observation view field covering an area of 0.02 mm$^2$ (rectangular area with 0.1 mm vertical length and 0.2 mm horizontal width) on the cross sectional plane of the lining 11 by an electron microscope with 7000 times of the optical magnification. FIG. 3A and FIG. 3B are photographs of the observation images. As shown in the FIG. 3A, a portion of the observation image where Bi particles 11b existed at the boundary surface X between the lining 11 and the overlay 12 is visually observed. Further, as shown in the FIG. 3B, a line segment L (broken line) connecting both endpoints of the Bi particle 11b at the boundary surface X was detected and visible edges existing in the area not farther than 1 μm from the line segment L, were detected as the boundary portion Y (one dot chain line).

In addition, within the line segment L the portion where edges exist in an area not farther than 1 μm and portions B (arrow) of the line segment L whose edge did not exist in the area not farther than 1 μm were detected. The epitaxial index was calculated by dividing the length of the portions B by the length of the line segment L. Further, the epitaxial index of each of Bi particles 11b existing at the boundary surface X was measured. In the present embodiment, the maximum epitaxial index of the sliding member 1 was 10%. In addition, the edge can be detected by the image analyzing system input the observation image.

(1-3) Manufacturing Method of a Sliding Member:

In the beginning, a low carbon steel flat plate whose thickness was same as the thickness of the back metal 10 was prepared.

Next, the powder of the materials for the lining 11 was scattered on the flat plate made of the low carbon steel. Concretely, Cu powder, Bi powder and Sn powder were scattered on the low carbon steel flat plate to be same weight ratio as the weight ratio of the components of abovementioned lining 11. As long as the weight ratio of the components of the lining 11 can be satisfied, powder of alloy e.g. Cu—Bi and Cu—Sn can be scattered on the low carbon steel flat plate. The particle diameter of the powder was regulated to be not larger than 150 μm by a test sieve (JIS Z8801).

Next, the low carbon steel flat plate and the powder scattered on the low carbon steel flat plate were sintered. The sinter was performed in inert atmosphere and the sintering temperature was set to the range of 700 to 1000° C. Cooling was performed after sinter.

The Cu alloy layer was formed on the low carbon steel flat plate after completion of the cooling. The soft Bi particles 11b deposited were included in this Cu alloy layer.

Next, the low carbon steel flat plate whereon the Cu alloy layer was formed, was processed by the press working to be in the bisection shape of the hollow cylinder sectioned at a diametral plane. Then, the press working was performed to make the outer diameter of the low carbon steel flat plate same as the outer diameter of the sliding member 1.

Next, the Cu alloy layer formed on the low carbon steel flat plate was processed by grinding. Then, the grinding depth was controlled to make the thickness of the Cu alloy layer formed on the low carbon steel flat plate same as the thickness of the lining 11. The grinding was performed by the lathe on which is set the cutting tool made of the abrasive e.g. sintered diamonds. The surface of the lining 11 after grinding was the boundary surface X between the lining 11 and the overlay 12.

Next, the oxide films were formed on the surfaces of Bi particles 11b, by anodic oxidation of the surfaces of Bi particles 11b exposed on the surface of the lining 11. The anodic oxidation was performed by the method as follows. First, the degreasing of the surface of the lining 11 was performed by flowing direct minus current to the surface of the lining 11 in an electrolyte. Next, the surface of the lining 11 was rinsed with water. After completion of these pretreatments, the anodic oxidation was performed by flowing direct plus current to the lining 11 dipped in the anodizing solution. The composition of the anodizing solution included the sodium hydroxide with density range of 10 to 50 g/L. The temperature of the anodizing solution was 60° C. Further, the current supplied to the surface of the lining 11 was direct current and the current density of the direct current was in the range of 0.5 to 5.0 A/dm$^2$.

Next, the overlay 12 was formed by laminating Bi as the soft material with thickness of 10 μm on the anodized surface of the lining 11, by the electroplating. The procedure of the electroplating was as follows. First, the degreasing of the anodized surface of the lining 11 was rinsed with water. Further, unnecessary oxides on the surface of the lining 11 were removed by pickling. After that, the surface of the lining 11 was rinsed with water again. After completion of abovementioned pretreatments, the electroplating was performed by supplying current to the surface of the lining 11 immersed in the plating liquid. The composition of the plating liquid included Bi with density range of 10 to 50 g/L, the organic sulfonic acid with density range of 25 to 100 g/L and additive agents with density range of 0.5 to 50 g/L. The temperature of the plating liquid was 25° C. Further, the current supplied to the surface of the lining 11 was direct current and the current density of the direct current was in the range of 0.5 to 5.0 A/dm$^2$.

By performing the electroplating as remarked above, the overlay 12 could be laminated with refraining Bi from being epitaxially growing from Bi particles 11b existing on the surface of the lining 11. After completion of lamination of the overlay 12, the manufacturing of the sliding member 1 was completed by rinsing with water and drying. Further the sliding bearing A was manufactured by combining two sliding members 1 to be in the cylindrical shape.

(2) Other Embodiment

The sliding member 1 composing the sliding bearing A that supports the crankshaft for the engine was exemplary shown in the above embodiment, the sliding bearing A for other use can be made of the sliding member 1 of the present invention. For example, gear bushes for transmission, piston bushes and boss bushes can be made of the sliding member 1. Needless to say, the sliding member 1 can be parts whereon any mating members other than shafts are sliding. The matrix of the lining 11 does not limit to Cu alloy, the material of the matrix can be selected according to the hardness of the mating shaft 2. Further, materials e.g. Pb, Sn, In (indium) that are softer than the matrix and are able to deposit in the matrix, can be the soft material. And it is not necessarily that the oxide films are formed on the boundary surface X, for example, the epitaxial growth of Bi from Bi particles 11*b* can be refrained by supplying large current to the surface of the lining 11 for the electroplating.

Description of the Reference Numerals

1: sliding member, 2: mating shaft, 10: back metal, 11: lining, 11*a*: matrix, 11*b*: Bi particles, 12: overlay, 12*a*, 12*b*:, X:boundary surface, Y:boundary portion

The invention claimed is:
1. A sliding member, comprising:
a base layer comprising soft particles made of a soft material deposited in a matrix; and
a soft layer made of the soft material,
wherein the soft material is softer than the matrix,
wherein the soft material is formed on a surface of the base layer,
wherein a boundary portion is formed between crystal grains of the soft particles and crystal grains of the soft layer,
wherein a structure of the crystal gains of the soft particles is different from a structure of the crystal grains of the soft layer, and
wherein an anodic oxidation film of the soft material is formed on the boundary portion.
2. The sliding member according to claim 1, wherein the matrix is made of Cu alloy, and
the soft material is Bi.
3. A sliding bearing, comprising:
a base layer comprising soft particles made of a soft material deposited in a matrix; and
a soft layer made of the soft material,
wherein the soft material is softer than the matrix,
wherein the soft material is formed on a surface of the base layer,
wherein a boundary portion is formed between crystal grains of the soft particles and crystal grains of the soft layer,
wherein a structure of the crystal grains of the soft particles is different from a structure of the crystal grains of the soft layer, and
wherein an anodic oxidation film of the soft material is formed on the boundary portion.
4. The sliding bearing according to claim 3, wherein the matrix is made of Cu alloy, and
the soft material is Bi.

* * * * *